Patented Oct. 10, 1933

1,929,942

UNITED STATES PATENT OFFICE 1,929,942

METHOD OF PREPARING ALUMINUM OXIDE GEL

Earle H. Barclay, Baltimore, Md., assignor to The Silica Gel Corporation, Baltimore, Md., a corporation of Maryland No Drawing. Application July 6, 1929
Serial No. 376,491

12 Claims. (Cl. 23—143)

The present application which is a continuation in part of my application, Serial No. 185,905, filed April 22, 1927, relates to hard, stable, highly porous adsorbent gels of aluminum oxide and methods of preparing same.

Aluminum oxide gels may be produced by reacting a solution of an aluminum salt with a reagent. The aluminum salt employed may be either a salt having a basic reaction such as sodium aluminate or a salt having an acidic reaction such as aluminum chloride or aluminum sulphate. The reagent used may be either an alkali such as sodium hydroxide, potassium hydroxide, or ammonium hydroxide or an acid such as sulphuric acid depending upon the particular type of aluminum salt selected. If the selected aluminum salt is one having an acidic reaction, then the reagent used is an alkali. On the other hand, if the aluminum salt used is of a basic character, then the reagent employed is an acid.

The proportions and concentrations of the aluminum salt solution and the reagent employed should be such that the reaction mass is slightly alkaline. It has been found that satisfactory products having the desired adsorptive properties are obtained only if the reaction mass is alkaline. Products which are obtained from a mass which is acid are precipitates, and are practically worthless as adsorbents. This applies not only to the reaction mass obtained by mixing an aluminum salt solution of an acid character with an alkali but also to the mass produced by the reaction of an aluminum salt solution of a basic character with an acid.

The alkalinity of the reaction mass controls the character of the product. Generally speaking, reaction masses which have an alkalinity lying between neutrality and 0.1 N alkali produce satisfactory gels but the range of alkalinity varies inversely with the temperature at which the ingredients are mixed, the lower the temperature, the wider the range of alkalinity. For example, by mixing the reacting materials at a temperature of —5° C., the range of alkalinity of the reaction mass is from neutrality to 0.06 N alkali. At higher temperatures of mixing, the range is less.

By mixing the ingredients at a temperature of 0° C., the range of alkalinity of the reaction mass is from neutrality to 0.04 N alkali.

If the ingredients are mixed at a temperature of 20° C., the range of alkalinity of the reaction mass is from neutrality to 0.02 N alkali.

Where it is desired to mix the ingredients at a temperature of 60° C., the range of alkalinity of the reaction mass is from neutrality to 0.002 N alkali. Due to the limited range it is necessary that very exact proportions and concentrations be employed if a fair gel is to be obtained. The very minutest change in the concentrations or proportions of either ingredient will result in a poor gel or no gel at all.

A gel of aluminum oxide may be prepared by mixing equal volumes of a solution of aluminum sulphate of about 5 to 10% strength and a normal alkali solution such as sodium hydroxide or ammonium hydroxide at a low temperature. The temperature should preferably be 0° C. or lower, say —5° C. The aluminum sulphate solution may be added to the alkali solution or vice versa, or the two solutions may be brought together simultaneously. Care should be taken however, that the reaction mass is alkaline. The mass should preferably be agitated during the mixing.

The gelatinous precipitate which forms is then washed by decantation to free it of excess alkali and the ammonium or sodium sulphate depending upon the particular alkali employed in the formation of the precipitate. The resulting jelly-like mass is then dried at about 100° C. or a little thereabove, and thereafter subjected to a higher temperature, for instance 150° to 200° C. for 2 or 3 hours. The resulting product will contain not less than about 3% water, depending upon the length of time of drying, the temperature, etc.

The washing, previously mentioned, may be effected at any point before, during or after the drying, or at two or more of said points, but it is preferred to wash the material before drying.

An aluminum oxide gel may also be prepared according to the present invention by mixing equal volumes of a solution of sodium aluminate of about 5% strength with a normal acid solution such as sulphuric acid at a low temperature. The temperature at which the ingredients are mixed should not exceed 20° C., or lower, preferably about 0° C. During the mixing the ingredients are thoroughly agitated. Care should be taken that they are brought together in such manner that the reaction mass is alkaline.

The jelly-like mass obtained is then washed and dried in the same manner as described in connection with the preceding process.

The aluminum oxide gels formed are hard, stable and highly porous products, and are capable of adsorbing water vapor to such an extent as to contain at least 21% of their weight (dry) of water when in equilibrium with water vapor at 30° C. and a partial pressure of 22 mm. of mercury.

"Opposite character", as employed in the appended claims, refers to the acidic or basic properties.

Having thus described the invention, what is claimed as new and desired to be secured by Letters Patent is:

1. In the process of preparing an aluminum oxide adsorbent gel, the step which comprises mixing a solution of an aluminum containing salt with a compound of opposite character selected from the group consisting of alkalis and acids adapted to react with said salt to form a gelatinous mass at a low temperature, the proportions and concentrations of said salt solution and reagent being such that the reaction mass is slightly alkaline.

2. In the process of preparing an aluminum oxide adsorbent gel, the step which comprises mixing a solution of an aluminum containing salt with a compound of opposite character selected from the group consisting of alkalis and acids adapted to react with said salt to form a gelatinous mass at a low temperature, the proportions and concentrations of said salt solution and reagent being such that the reaction mass is of an alkalinity of less than 0.1 N alkali.

3. In the process of preparing an aluminum oxide adsorbent gel, the step which comprises mixing a solution of an aluminum containing salt with a compound of opposite character selected from the group consisting of alkalis and acids adapted to react with said salt to form a gelatinous mass at a temperature not exceeding 20° C., the proportions and concentrations of said salt and reagent being such that the reaction mass is slightly alkaline.

4. In the process of preparing an aluminum oxide adsorbent gel, the step which comprises mixing a solution of an aluminum containing salt with a compound of opposite character selected from the group consisting of alkalis and acids adapted to react with said salt to form a gelatinous mass at a temperature of about 0° C., the proportions and concentrations of said salt and reagent being such that the reaction mass is slightly alkaline.

5. In the process of preparing an aluminum oxide adsorbent gel, the step which comprises mixing an aluminum salt solution with an alkali at a low temperature, the proportions and concentrations of said salt solution and alkali being such that the reaction mass is slightly alkaline.

6. In the process of preparing an aluminum oxide adsorbent gel, the step which comprises mixing an aluminum salt solution with an alkali at a low temperature, the proportions and concentrations of said salt solution and alkali being such that the reaction mass is of an alkalinity of less than 0.1 N alkali.

7. In the process of preparing an aluminum oxide adsorbent gel, the step which comprises mixing an aluminum salt solution with an alkali at a temperature of about 0° C., the proportions and concentrations of said salt solution and alkali being such that the reaction mass is of an alkalinity of less than 0.1 N alkali.

8. The process of preparing an aluminum oxide adsorbent gel which comprises mixing a solution of an aluminum salt with alkali at a low temperature, the proportions and concentrations of said salt solution and alkali being such that the reaction mass is slightly alkaline, drying the solid material formed thereby, and washing it at some stage of its preparation.

9. The process of preparing an aluminum oxide adsorbent gel which comprises mixing a solution of an aluminum salt with alkali at a temperature of about 0° C., the proportions and concentrations of said salt solution and alkali being such that the reaction mass is of an alkalinity of less than 0.1 N alkali, washing the material formed thereby and drying it.

10. The process of preparing an aluminum oxide adsorbent gel which comprises mixing an aluminum sulphate solution with an alkali solution at a temperature of about 0° C., the proportions and concentrations of said solution and alkali being such that the reaction mass is of an alkalinity ranging between neutrality and 0.04 N alkali, washing the solid matter formed thereby, and drying it.

11. A hard, stable, highly porous gel comprising aluminum oxide, and capable of adsorbing water vapor to such an extent as to contain at least 21% of its weight of water when in equilibrium with water vapor at 30° C. and a partial pressure of 22 mm. of mercury.

12. A hard, stable, highly porous gel comprising aluminum oxide produced under alkaline conditions, and capable of adsorbing water vapor to such an extent as to contain at least 21% of its weight of water when in equilibrium with water vapor at 30° C. and a partial pressure of 22 mm. of mercury.

EARLE H. BARCLAY.